US011855987B1

(12) United States Patent
 Chhabra

(10) Patent No.: US 11,855,987 B1
(45) Date of Patent: Dec. 26, 2023

(54) UTILIZING DISTRIBUTED LEDGER FOR CLOUD SERVICE ACCESS CONTROL

(71) Applicant: Amazon Technologies, Inc., Seattle, WA (US)

(72) Inventor: Jasmeet Chhabra, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 504 days.

(21) Appl. No.: 15/808,627

(22) Filed: Nov. 9, 2017

(51) Int. Cl.
 *H04L 9/00* (2022.01)
 *H04L 9/40* (2022.01)
 *H04L 9/32* (2006.01)

(52) U.S. Cl.
 CPC ........... *H04L 63/10* (2013.01); *H04L 9/3247* (2013.01); *H04L 63/0281* (2013.01); *H04L 63/0428* (2013.01); *H04L 63/12* (2013.01); *H04L 63/20* (2013.01); *H04L 63/0272* (2013.01)

(58) Field of Classification Search
 CPC ... H04L 63/10; H04L 9/3247; H04L 63/0281; H04L 63/0428; H04L 63/12; H04L 63/20; H04L 63/0272
 See application file for complete search history.

(56) References Cited

U.S. PATENT DOCUMENTS

| | | | | |
|---|---|---|---|---|
| 5,892,900 A * | 4/1999 | Ginter | ..................... | G06F 21/78 726/26 |
| 7,328,287 B1 * | 2/2008 | Arumugham | ........... | G06F 3/067 710/33 |
| 10,454,921 B1 * | 10/2019 | Chen | ................... | H04L 63/0428 |
| 10,554,649 B1 * | 2/2020 | Fields | ................. | H04L 63/0823 |
| 2011/0119732 A1 * | 5/2011 | Dunn | .................... | H04L 63/102 726/1 |
| 2014/0207861 A1 * | 7/2014 | Brandwine | ............. | H04L 51/52 709/204 |
| 2016/0105420 A1 * | 4/2016 | Engan | ................. | H04W 12/068 455/411 |
| 2016/0134616 A1 * | 5/2016 | Koushik | ............... | G06F 21/335 726/9 |
| 2019/0245856 A1 * | 8/2019 | Irwan | ..................... | G06F 15/76 |

* cited by examiner

*Primary Examiner* — Daniel B Potratz
*Assistant Examiner* — Syed M Ahsan
(74) *Attorney, Agent, or Firm* — Lowenstein Sandler LLP

(57) ABSTRACT

A method of utilizing a distributed ledger for a cloud service access control. The method may include receiving, by an identity and access management (IAM) service, an identifier of a client of a cryptographically protected distributed ledger; transmitting, to a proxy service, a subscription request for distributed ledger transactions initiated by the client; receiving, from the proxy service, a transaction notification comprising an identifier of the client, an identifier of an autonomous agent, and an identifier of a cloud service; receiving, from the cloud service, a validation request with respect to an action request submitted by the autonomous agent; validating, using the transaction notification, the action request; and notifying the cloud service of validity of the action request.

19 Claims, 10 Drawing Sheets

US 11,855,987 B1

UTILIZING DISTRIBUTED LEDGER FOR CLOUD SERVICE ACCESS CONTROL

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity, and measured service. The cloud computing model includes several service models, including Software as a Service (SaaS), Platform as a Service (PaaS), and Infrastructure as a Service (IaaS). The cloud computing model may be implemented according to one of the several deployment models, including private cloud, community cloud, public cloud, and hybrid cloud.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding.

DETAILED DESCRIPTION

Figure 1:
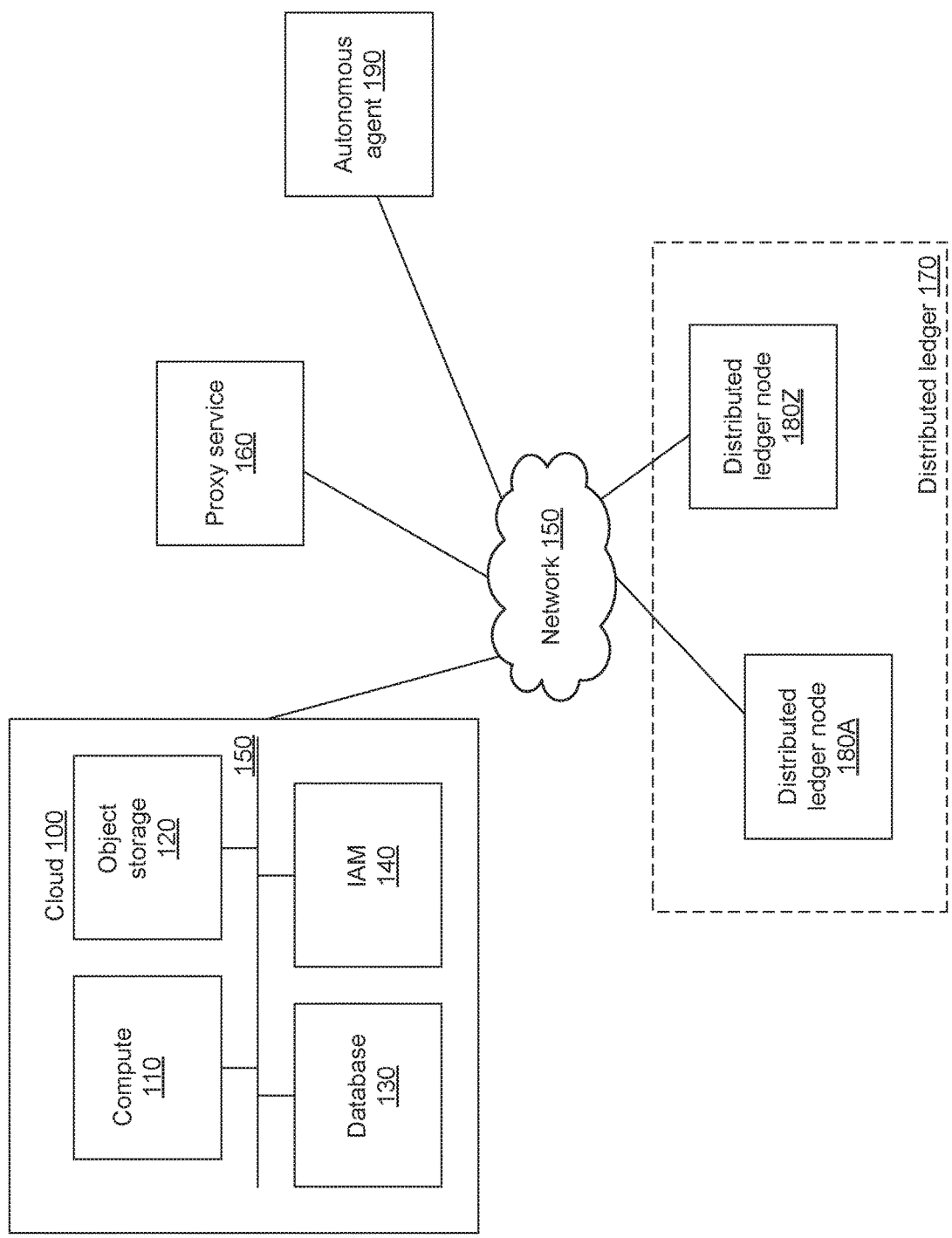
FIG. 1 schematically illustrates one embodiment of a cloud infrastructure, in accordance with one embodiment.

Described herein are systems and methods for utilizing distributed ledgers for cloud service access control.

Examples of cloud services include compute services that provide scalable computing capacity (e.g., in the form of virtual machine instances or containers), object storage services that implement scalable object storage systems, database services that implement structured query language (SQL) interface or NoSQL interfaces, and other services which may include one or more software applications, the hardware on which the applications are executed, and the supporting infrastructure including auxiliary hardware components and other resources (e.g., load balancers, security certificates, configuration settings, and health monitors). Access to one or more cloud services may be controlled by an Identity and Access Management (IAM) service, which may authenticate a requesting client based on the presented client credentials and enforce permission-based granular access control to the cloud resources by applying associated resource access policies.

Various third-party agents may be integrated with cloud-based services by assigning a client's cloud service access rights to such agents on a temporary or permanent basis. In one embodiment, assignments of cloud service access rights and other cloud service-related transactions may be recorded using a distributed ledger. The distributed ledger may be implemented an immutable append-only database, in which the transaction records are replicated by multiple nodes. The distributed ledger may be cryptographically-protected, e.g., by cryptographically encrypting the transaction records, such that reversing a transaction becomes computationally infeasible. In one embodiment, the cryptographically-protected distributed ledger may be implemented by a blockchain, as described in more detail herein below.

In one embodiment, a transaction record may reflect a contract, such as assignment of rights (e.g., assignment of cloud service access rights). Accordingly, a transaction record may specify the parties to the contract (e.g., the assignor and the assignee of the cloud service access rights being assigned), the transaction object (e.g., a client account or other identifier of the rights being assigned), the transaction type (e.g., permanent or temporary assignment of rights with respect to the specified transaction object). The transaction record may further specify additional attributes of the transaction, such as the period of time during which the time-based contract is in force.

In one embodiment, a cloud IAM service may be integrated with one or more distributed ledgers via an interface which may be implemented by a distributed ledger proxy service facilitating enforcement of the contracts registered by the distributed ledger with respect to access rights to the cloud services controlled by the IAM service. The distributed ledger proxy service may subscribe to receiving transaction records from one or more distributed ledgers.

In one embodiment, a cloud service client may notify the IAM service of a distributed ledger client identifier (such as a blockchain address) utilized for recording transactions reflecting the access right assignment with respect to one or more cloud services controlled by the IAM service. Responsive to receiving the notification, the IAM service may associate the specified distributed ledger client identifier with an existing or newly created IAM account. The IAM service may further request the distributed ledger proxy service to provide notifications of transactions associated with the specified distributed ledger client identifier.

The cloud service client may then record, with the distributed ledger, a transaction record reflecting an assignment, to an autonomous agent, of certain access rights with respect to cloud services. The autonomous agent may be represented by a third-party service that operates on the client's behalf based on the contract recorded with the distributed ledger. Accordingly, the transaction record may include the distributed ledger client identifier, the identifier of the autonomous agent, the transaction type (e.g., assignment of cloud service access rights), the contract expiration time (e.g., the expiration time of the assignment of rights), and the associated access policy (e.g., the policy describing the cloud service access rights being assigned to the autonomous agent).

Upon having been recorded by the distributed ledger, the transaction record may be sent to the distributed ledger proxy service, which may then notify the IAM service of the access rights assignment, including the distributed ledger client identifier, the autonomous agent identifier, the assignment expiration time, and the associated access policy. When the autonomous agent requests the access to the cloud service, the IAM service would validate such a request based on the recorded assignment of access rights, as described in more detail herein below.

FIG. 1 schematically illustrates one embodiment of a cloud infrastructure, in which systems and methods described herein may operate. As shown in FIG. 1, the cloud infrastructure 100 may include the compute service 110, the object storage service 120, the database service 130, the IAM service 140, as well as various other services that are omitted from FIG. 1 for clarity and conciseness. While FIG. 1 illustrates each of the above listed services running in dedicated clusters including one or more hardware servers, in certain implementations, two or more services may be collocated in a cluster including one or more hardware servers. Servers executing the above listed services may be interconnected by one or more networks 150, including one or more local area networks, one or more wide area networks, or any combination thereof.

In various illustrative examples, the compute service 110 may provide scalable computing capacity, e.g., in the form of virtual machine instances or containers. The object storage service 120 may implement a scalable object storage system with a web service interface. The database service 130 may implement a database exporting a structured query language (SQL) interface or a NoSQL interface. The IAM service 140 may provide client authentication and authorization by authenticating a requesting client based on the presented client credentials (e.g., a cryptographic certificate) and enforcing permission-based granular access control to the cloud resources based on associated access policies. An access policy may include one or more sets of resource access permissions for a specified resource, based on a client identifier and/or group. These and other services may have configurable high-availability, auto-scaling and other operational features.

In one embodiment, a distributed ledger proxy service 160 may be implemented to provide an interface between one or more distributed ledgers 170 and the cloud IAM service 140, thus facilitating enforcement of the contracts registered by the distributed ledger 170 with respect to access rights to the cloud services provided by the cloud 100. While the distributed ledger proxy service 160 is shown in the example of FIG. 1 as residing outside of the cloud infrastructure 100, in other embodiments, the distributed ledger proxy service 160 may be provided as a component of the cloud infrastructure 100 or as a node of the distributed ledger 170. Communications between the distributed ledger nodes 180A-180Z, between the distributed ledger proxy service 160 and the distributed ledger nodes 180A-180Z, between the distributed ledger proxy service 160 and the IAM service 140, and/or between the autonomous agent 190 and the cloud infrastructure 100 may by cryptographically protected by virtual private networks (VPNs) and/or transport-layer encryption.

In one embodiment, the distributed ledger 170 may be implemented an immutable append-only database, in which the transaction records are replicated by a plurality of distributed ledger nodes 180A interconnected by various combinations of private and public networks. The distributed ledger 170 may be cryptographically-protected, e.g., by cryptographically encrypting transaction records, such that reversing a transaction becomes computationally infeasible. In one embodiment, the cryptographically-protected distributed ledger may be implemented by a blockchain.

Figure 2:
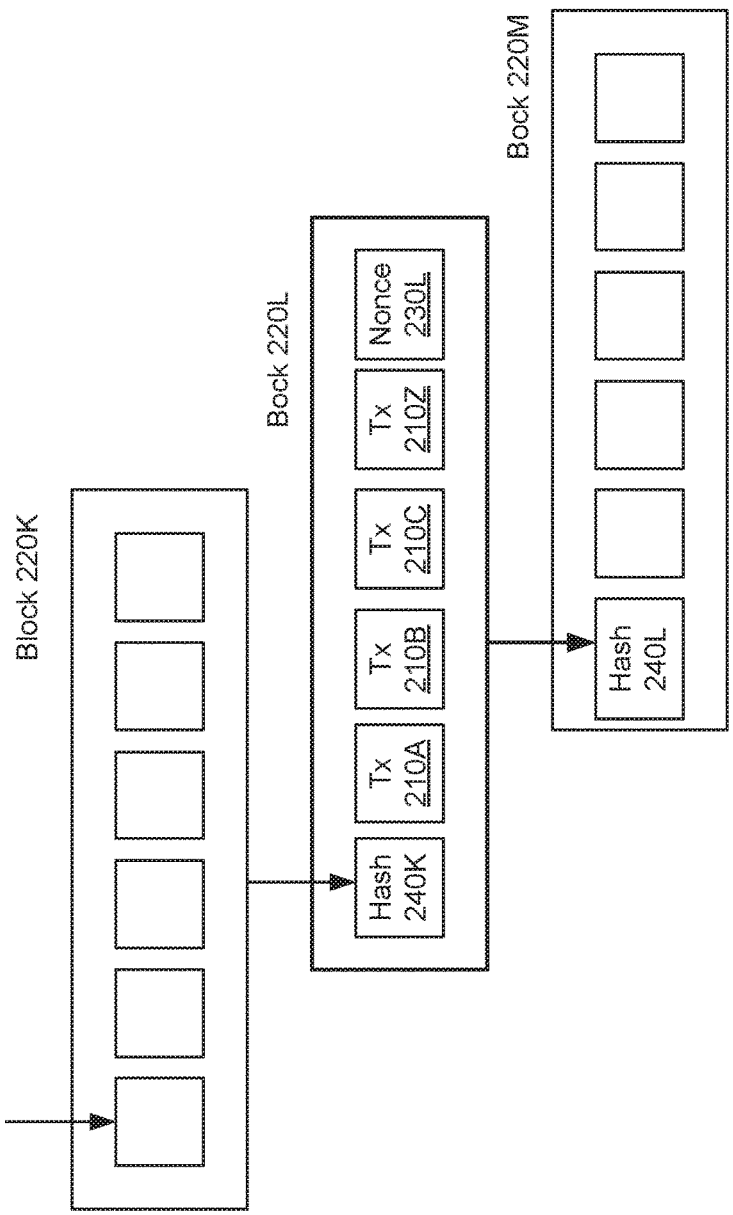
FIG. 2 schematically illustrates operation of a cryptographically-protected distributed ledger, in accordance with one embodiment.

FIG. 2 schematically illustrates operation of a cryptographically-protected distributed ledger, in accordance with one embodiment. In one embodiment, new transaction records may be broadcasted and may be received by all currently active distributed ledger nodes. Each transaction record may be digitally signed by the initiator and may identify the parties by their respective blockchain addresses.

As schematically illustrated by FIG. 2, each node receiving the broadcasted transaction records may assemble several transaction records 210A-210Z into a block, and may perform one or more cryptographic operations on the block to produce a cryptographically-protected block 220L. In one embodiment, cryptographically protecting a block may involve incrementing a nonce field 230L comprised by the block until a value of the nonce is found such that a cryptographic hash 240L of the block would satisfy a pre-defined condition (e.g., comprise a pre-determined number of leading zero bits). A cryptographic hash may be represented by an irreversible function mapping a first bit sequence of arbitrary size to a second bit sequence of a pre-determined size, such that two different bit sequences are unlikely to produce the same hash value. The computations performed in order to cryptographically protect a block may be referred to as "proof-of-work."

Upon producing a cryptographically-protected block 220L, the node may broadcast the cryptographically-protected block 220L to the peer nodes. A node receiving the cryptographically-protected block 220L may accept the block and incorporate the hash 240L of the accepted block into the next block 220M.

Thus, the distributed ledger produces an immutable chain of cryptographically-protected transaction records. Any modification (other than adding transactions) of the chain is computationally infeasible as such a modification would require repeating all the proof-of-work calculations. Peer nodes can leave and join the distributed ledger at any time, accepting the longest chain as the ledger record reflecting the transactions that have been performed before a given node has joined the network.

Referring again to FIG. 1, a client of the cloud infrastructure 100 may employ one or more autonomous agents 190 for performing certain tasks using the cloud services provided by the cloud infrastructure 100. An autonomous agent 190 may be represented by a network-accessible third party service and may be implemented by an executable code, which is capable of communicating with the cloud services, either directly or via one or more adapters, brokers or other intermediary components, which are omitted from FIG. 1 for clarity and conciseness.

In one embodiment, a client of the cloud infrastructure 100 may assign at least a subset of the client's access rights with respect to one or more cloud services to an autonomous agent 190. The assignment of rights may be implemented by one or more transactions recorded by the distributed ledger 170, and may be communicated to the IAM service 140 by the distributed ledger proxy service 160, as described in more detail herein below with references to FIG. 3.

Figure 3A:
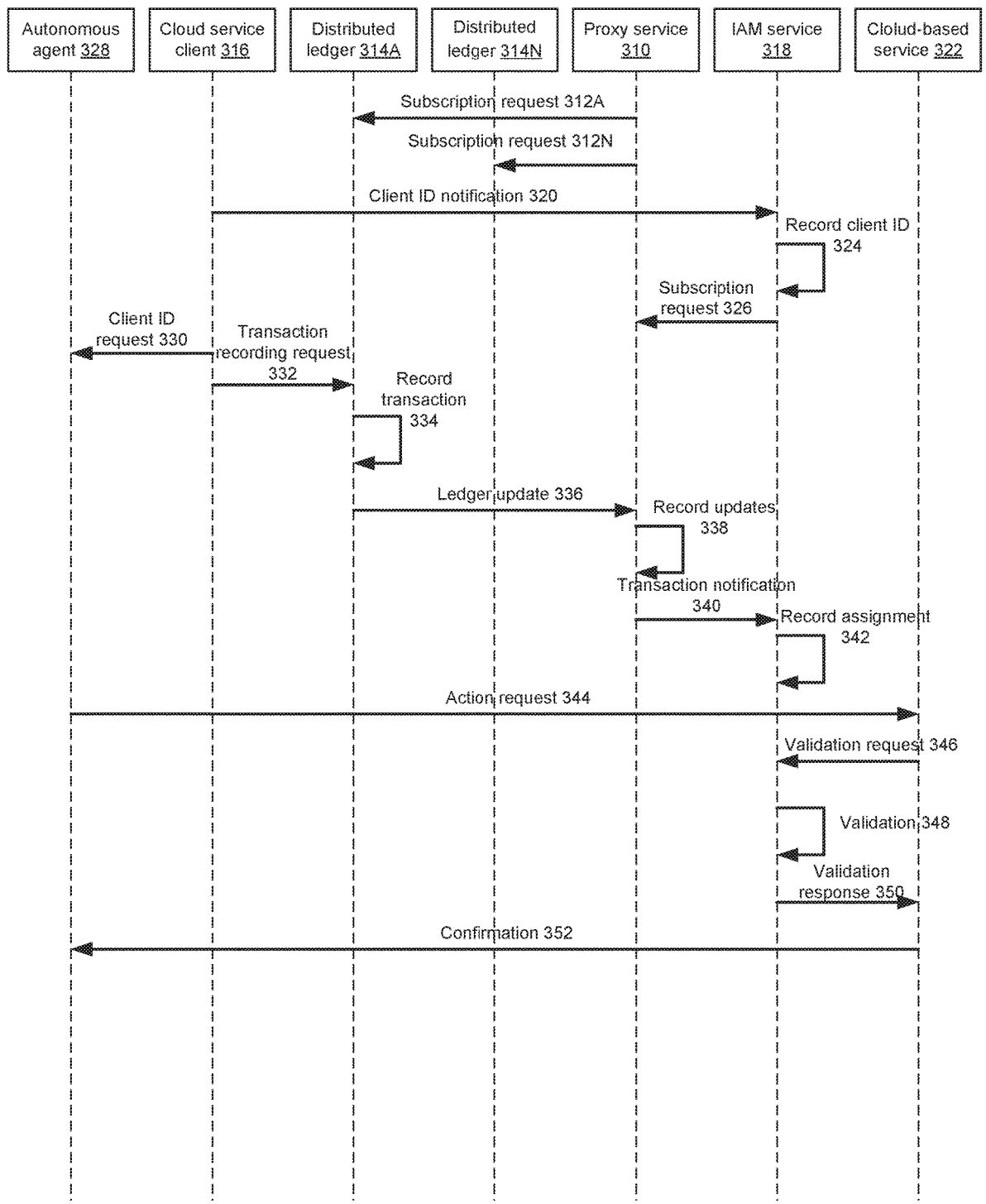
FIGS. 3A-3B represent component interaction diagrams illustrating interactions of the distributed ledger proxy service, IAM service, distributed ledger and other functional components, in one embodiment.
Figure 3B:
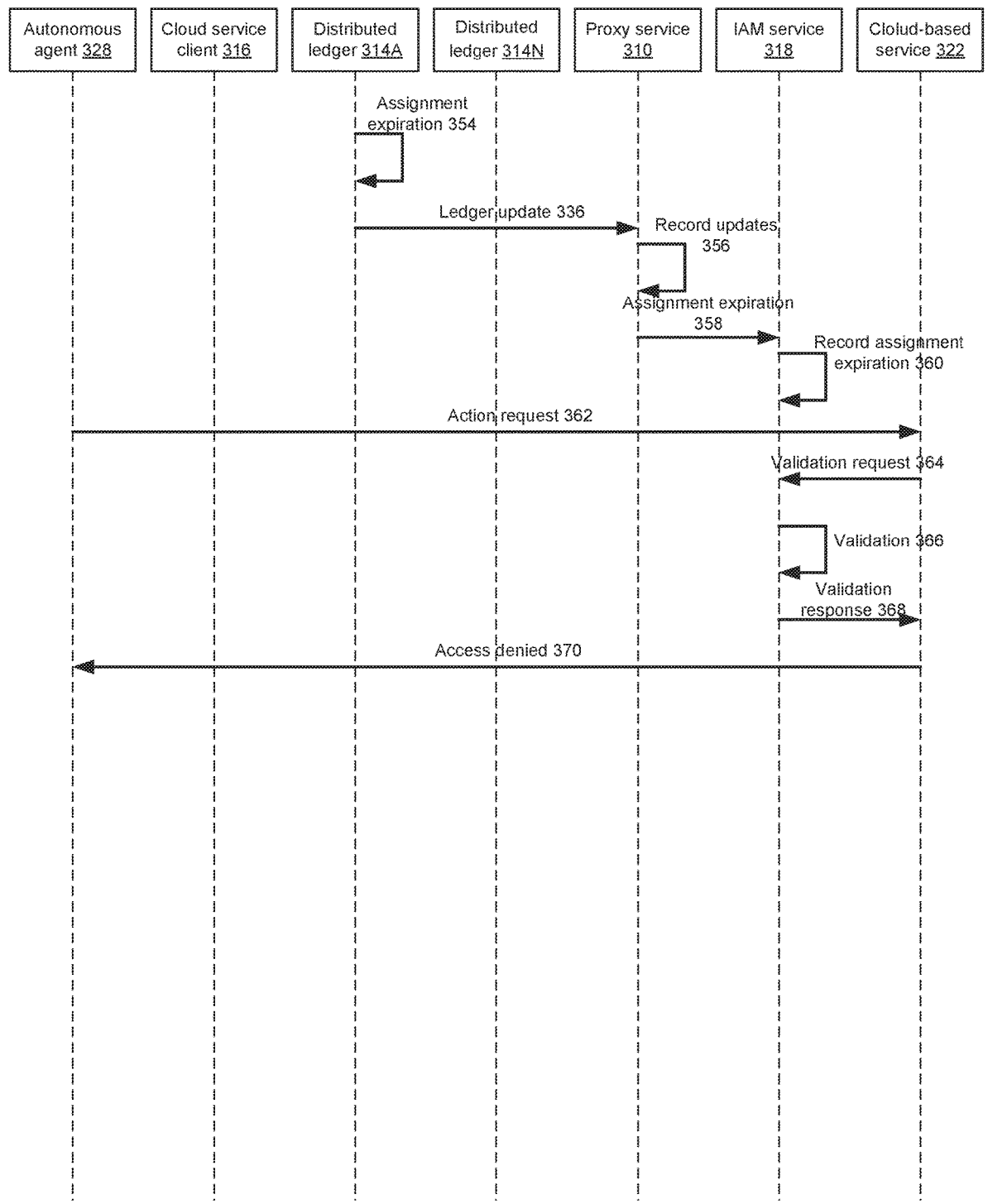

FIGS. 3A-3B represent component interaction diagrams illustrating interactions of the distributed ledger proxy service, IAM service, distributed ledger and other functional components, in one embodiment. As schematically illustrated by FIG. 3A, the distributed ledger proxy service 310 may subscribe to ledger updates, by transmitting subscription requests 312A and 312N to one or more distributed ledgers 314A-314N.

The cloud service client 316 may transmit, to the IAM service 318, a client identifier notification 320 of a distributed ledger client identifier (e.g., represented by a blockchain address) utilized for recording transactions initiated by the client 316, such as transactions reflecting assignments of access rights with respect to a cloud service 322. Responsive to receiving the notification 320, the IAM service 318 may associate, by the client identifier recordation operation 324, the specified distributed ledger client identifier with an existing or newly created IAM account. The IAM service 318 may further transmit, to the distributed ledger proxy service 310, a subscription request 326 to provide notifications of transactions associated with the distributed ledger client identifier of the client 316.

In order to assign cloud service access rights to an autonomous agent 328, the cloud service client 316 may execute a client identifier request 330 to obtain the distributed ledger client identifier associated with the autonomous agent 328. The cloud service client 316 may then transmit, to the distributed ledger 314A, a transaction recording request 332 reflecting assignment, to the autonomous agent 328, of certain access rights with respect to one or more cloud services which the cloud service client 316 is authorized to access.

Figure 4:
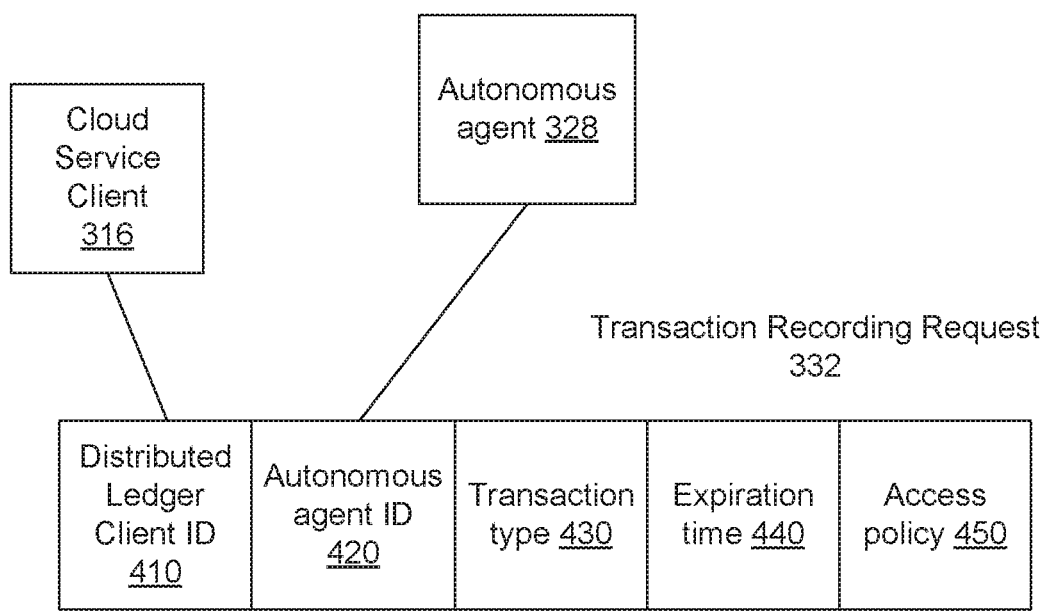
FIG. 4 schematically illustrates a data structure of a transaction recording request, in one embodiment.

FIG. 4 schematically illustrates a data structure of a transaction recording request, in one embodiment. As shown in FIG. 4, the transaction recording request 332 may include the distributed ledger client identifier 410 associated with the cloud service client 316, the identifier 420 of the autonomous agent 328, the transaction type 430 (e.g., assignment of cloud service access rights), the contract expiration time 440 (e.g., the expiration time of the assignment of rights), and the access policy 450 (e.g., the policy describing the cloud service access rights being assigned to the autonomous agent 328). The access rights specified by the access policy 450 may represent at least a subset of access rights of the cloud service client 316 with respect to one or more cloud services. In one embodiment, the access policy 450 may include one or more sets of resource access permissions for one or more cloud resources. Responsive to receiving the transaction recording request 332, the distributed ledger 314A may record the transaction by performing a transaction recording operation 334.

The distributed ledger proxy service 310 may periodically receive, from the subscribed distributed ledgers 314A-314N, ledger updates 336 comprising one or more transaction records. Periodic ledger updates 336 may be received asynchronously with respect to the other operations shown in FIGS. 3A-3B, and such periodic updates are omitted from FIGS. 3A-3B for clarity and conciseness.

Responsive to receiving the ledger update 336 including a notification of a transaction record with respect to a subscribed distributed ledger identifier, such as the distributed ledger identifier associated with the client 316 which was specified by the subscription request 326, the distributed ledger proxy service 310 may reflect, by the operation 338, the changes to the subscribed client identifier. The distributed ledger proxy service 310 may then transmit a transaction notification 340 to the IAM service 318. The transaction notification 340 may include the assignor identifier represented by the distributed ledger identifier associated with the client 316, the assignee identifier represented by the identifier of the autonomous agent 328, the access policy, and the assignment expiration time. Responsive to receiving the transaction notification 340, the IAM service 318 may record, by the assignment of rights recordation operation 342, the assignment of access rights by the client 316 to the autonomous agent 328. In one embodiment, performing the assignment of access rights recordation operation 342 may involve creating or modifying an access rule associated with the requested resource (e.g., the cloud service 322) and specifying the access rights defined by the access policy provided by the transaction notification 340.

Figure 5:
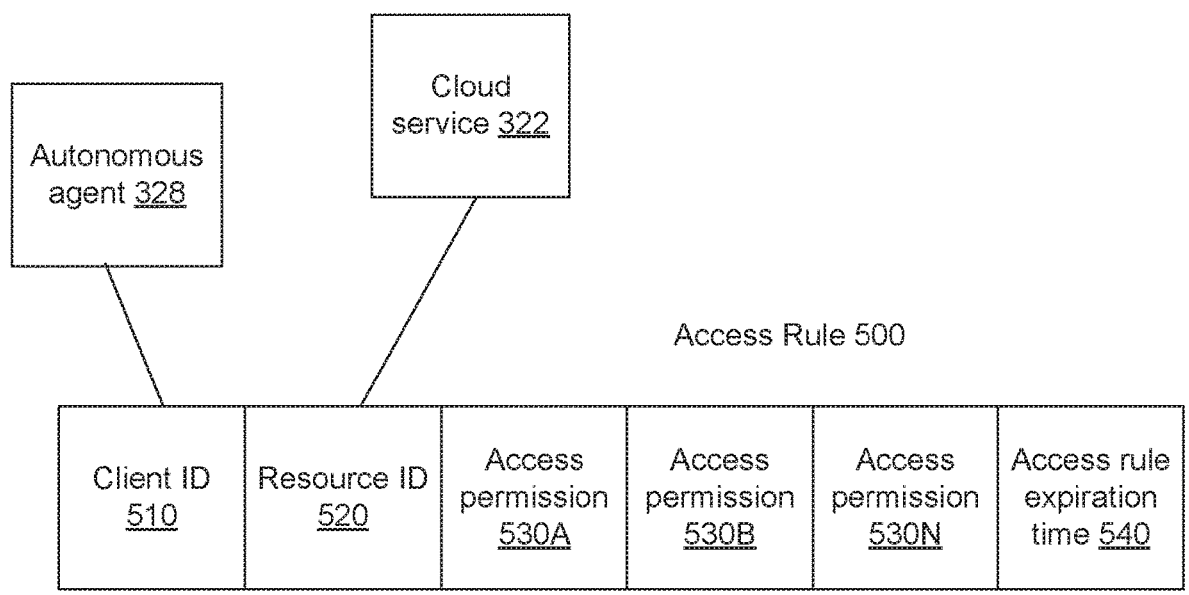
FIG. 5 schematically illustrates a data structure of an access rule, in one embodiment.

FIG. 5 schematically illustrates a data structure of an access rule, in one embodiment. As shown in FIG. 5, the access rule 500 may specify a client identifier 510, which may be set to the identifier of the autonomous agent 328. The access rule 500 may further specify a resource identifier 520, which may be set to the identifier of the cloud service 322. The access rule 500 may further specify one or more access permissions 530A-530N associated with the specified access types (e.g., read, write, and execute), which may be set to reflect the access rights defined by the access policy specified by the transaction notification 340, to the extent that such access is allowed by the access rights associated with the IAM service client identified by the distributed ledger client identifier 316. In other words, the IAM service client is only allowed to assign, to the autonomous agent, the access rights that the IAM client actually possesses at the time of the assignment. The access rule 500 may further specify the access rule expiration time 540, which may be set to the assignment expiration time specified by the transaction notification 340.

The autonomous agent 328 may transmit, to the cloud service 322, an action request 344 for performing a specified operation (e.g., a computational task, a database access operation, a storage operation, or an application-specific operation by one or more cloud applications). Accordingly, the action request 344 may include an identifier of the operation to be performed by the cloud service 322 and one or more parameters of the operation. The action request 344 may further include the authentication credentials of the autonomous agent 328. In one embodiment, the action request 344 may be cryptographically signed by the private key of the autonomous agent 328, and may include the digital certificate of the autonomous agent 328.

Responsive to receiving the action request 344, the cloud service 322 may transmit, to the IAM service 318, a validation request 346 for validating the action request 344. Responsive to receiving the validation request 346, the IAM service 318 may validate the digital certificate accompanying the action request 344 and the cryptographic signature of the action request 344. Validating the digital certificate may involve that the certificate has been issued by a known certificate authority, has not expired, and has not been revoked. Validating the cryptographic signature may involve decrypting the action request 344 using the public key of the autonomous agent 328 and ascertaining that the decrypted message comprises a pre-defined bit sequence or character string.

Upon successfully validating the digital certificate and the cryptographic signature of the action request 344, the IAM service 318 may perform the authorization validation operation 348, which may involve determining whether an access rule associated with the specified resource (e.g., the cloud service 322 specified by the action request 344) permits the autonomous agent 328 identified by the action request 362 to perform the requested operation (e.g., the operation specified by the action request 344) with respect to the specified resource. The IAM service 318 may then transmit, to the cloud service 322, a validation response 350 reflecting the result of matching the requested operation to one or more access rules associated with the requested resource. For example, responsive to successfully matching the action request 344 to the access rule created by the assignment of rights recordation operation 342, the IAM service 318 may transmit, to the cloud based service 322, a validation response 350 confirming the authorization to perform the requested operation. Responsive to performing the requested operation specified by the action request 344, the cloud service 322 may transmit, to the autonomous agent 328, a confirmation 352.

The autonomous agent 328 may issue multiple action requests, similar to the action request 344, to access the cloud service 322. Such requests will be successfully validated by the IAM service 318 until the expiration of the assignment, to the autonomous agent 328, of access rights to the cloud service 322 reflected by the transaction recording request 332. Conversely, an action request by the autonomous agent to access the cloud service 322 after the expiration of the assignment will not be validated by the IAM service 318.

Referring to FIG. 3B, the expiration of the assignment may be triggered by the distributed ledger 314A performing an assignment expiration recording operation 354. Responsive to receiving the ledger updates 336 following the assignment expiration recording operation 354, the distributed ledger proxy service 310 may reflect, by operation 356, the changes to the subscribed client identifier. The distributed ledger proxy service 310 may then transmit an assignment expiration notification 358 to the IAM service 318. The assignment expiration notification 358 may include the assignor identifier represented by the distributed ledger identifier associated with the client 316, the assignee identifier represented by the identifier of the autonomous agent 328, and the identifier of the expired access policy. Responsive to receiving the assignment expiration notification 358, the IAM service 318 may record, by assignment expiration recordation operation 360, the expiration of assignment of rights by the client 316 to the autonomous agent 328. In one embodiment, performing the assignment expiration recordation operation 360 may involve deleting or otherwise invalidating one or more access rules associated with the cloud resource identified by the assignment expiration notification 358 (e.g., the cloud service 322) to reflect the revocation of access rights that were previously granted by the expired access policy specified by the assignment expiration notification 358.

Alternatively, the IAM service 318 may process the expiration of the previously assigned access rights without receiving the assignment expiration notification 358. The JAM service 318 may detect expiration of one or more access rules by inspecting the expiration time fields 540 of the active access rules and deleting or otherwise invalidating the access rules for which the expiration time specified by the field 540 precedes the current time.

The action request 362 submitted by the autonomous agent 328 to access the cloud service 322 may trigger the validation request 364, which may be transmitted by the cloud service 322 to the JAM service 318.

Responsive to receiving the validation request 346, the JAM service 318 may validate the digital certificate accompanying the action request 362 and the cryptographic signature of the action request 362. Upon successfully validating the digital certificate and the cryptographic signature of the action request 362, the JAM service 318 may perform the authorization validation operation 368, which may involve determining whether the requested operation (e.g., the operation specified by the action request 362) is allowed by an access rule associated with the requested resource (e.g., the cloud service 322 specified by the action request 362). The JAM service 318 may then transmit, to the cloud service 322, a validation response 370 reflecting the failure to match the requested operation to a valid access rules associated with the requested resource.

While the example transactions described herein above with references to FIGS. 3A-3B are represented by assignment of rights transactions, various other contracts related to cloud-based services may be recorded by the distributed ledger 170 and processed by the distributed ledger proxy service 310.

Figure 6:
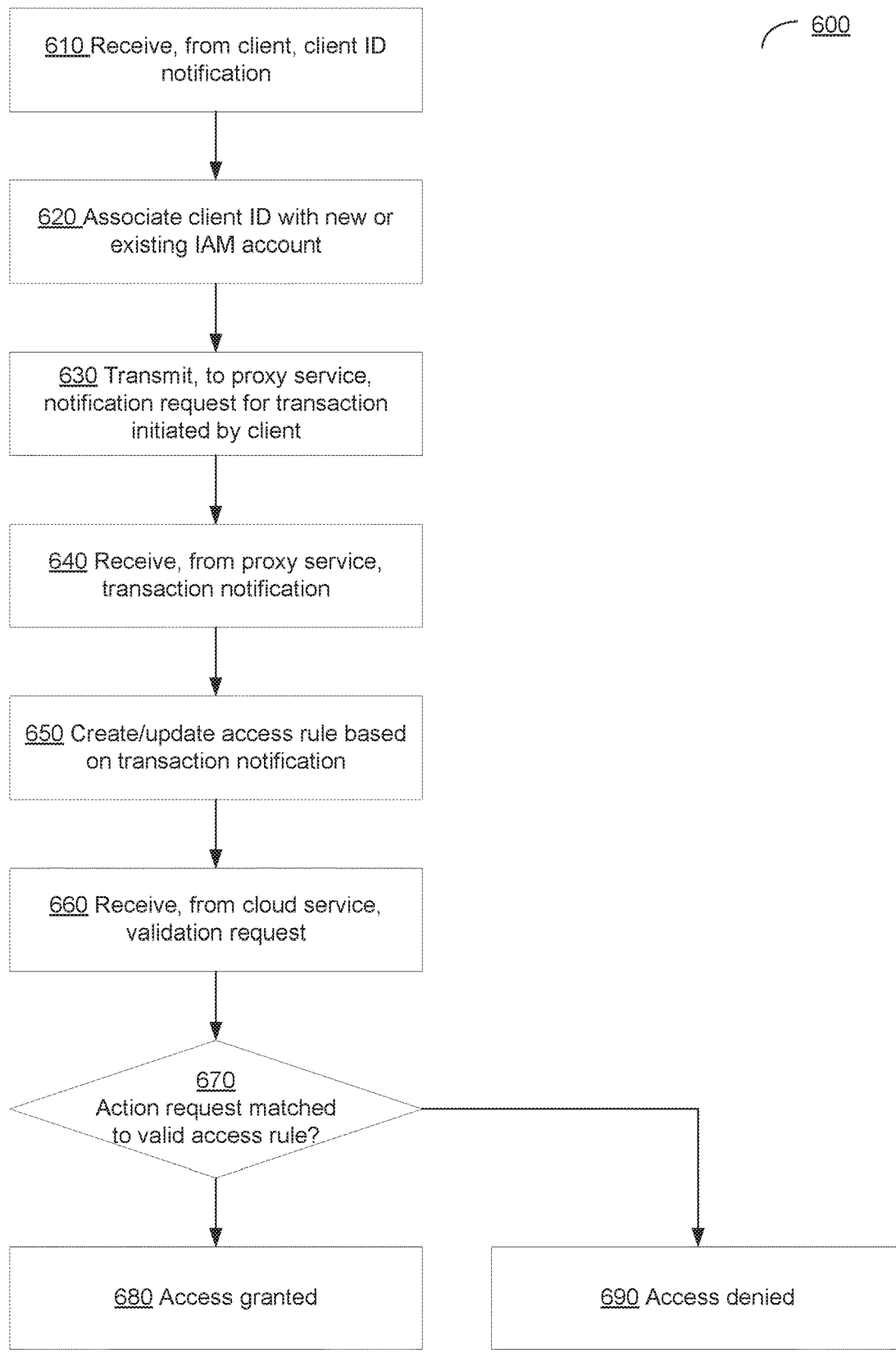
FIG. 6 is a flow diagram of one embodiment of a method implemented by an Identity and Access Management (IAM) service for enforcing distributed ledger contracts with respect to a cloud based service.

FIG. 6 is a flow diagram of one embodiment of a method implemented by an Identity and Access Management (JAM) service for enforcing distributed ledger contracts with respect to a cloud based service. Method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the computing device 900 of FIG. 9) implementing the method. In one embodiment, method 600 may be performed by a single processing thread. Alternatively, method 600 may be performed by two or more processing threads, each thread implementing one or more individual functions, routines, subroutines, or operations of the method. In one embodiment, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various embodiments of the method may perform at least some of the described operations in parallel or in arbitrary selected orders. In one embodiment, method 600 may be implemented by the IAM service 318 of FIGS. 3A-3B.

Referring to FIG. 6, at block 610, the IAM service implementing the method may receive a client notification identifying a client of a cryptographically protected distributed ledger. In one embodiment, the distributed ledger client identifier may be provided by a blockchain address utilized by the client for recording transactions by the cryptographically protected distributed ledger.

At block 620, the IAM service may associate the specified distributed ledger client identifier with an existing or newly created IAM account.

At block 630, the IAM service may transmit, to a distributed ledger proxy service, a subscription request to provide notifications of transactions associated with the specified distributed ledger client identifier.

At block 640, the IAM service may receive, from the proxy service, a transaction notification. In one example, the transaction notification may represent a contract recorded by the distributed ledger for assignment, to an autonomous agent, of access rights with respect to a cloud-based service. Accordingly, the transaction notification may specify the assignor (e.g., identified by the distributed ledger client identifier), the assignee (e.g., identified by the identifier of the autonomous agent), the access policy, and the assignment expiration time.

At block 650, the IAM service may create or modify an access rule associated with the identified cloud service. The access rule may specify one or more access permissions defined by the access policy provided by the transaction notification.

At block 660, the IAM service may receive, from a cloud service, a validation request with respect to an action request submitted by the autonomous agent. Responsive to receiving the validation request, the IAM service may validate the digital certificate accompanying the action request and the cryptographic signature of the action request.

Responsive to successfully validating, at block 670, the action request, the IAM service may, at block 680, transmit an access authorization message to the cloud service; otherwise, the IAM service may, at block 690, transmit an access refusal message to the cloud service. In one example, validating the action request may involve determining whether an access rule associated with the cloud that has initiated the validation request permits the autonomous agent to perform the operation specified by the action request, as described in more detail herein above.

Figure 7:
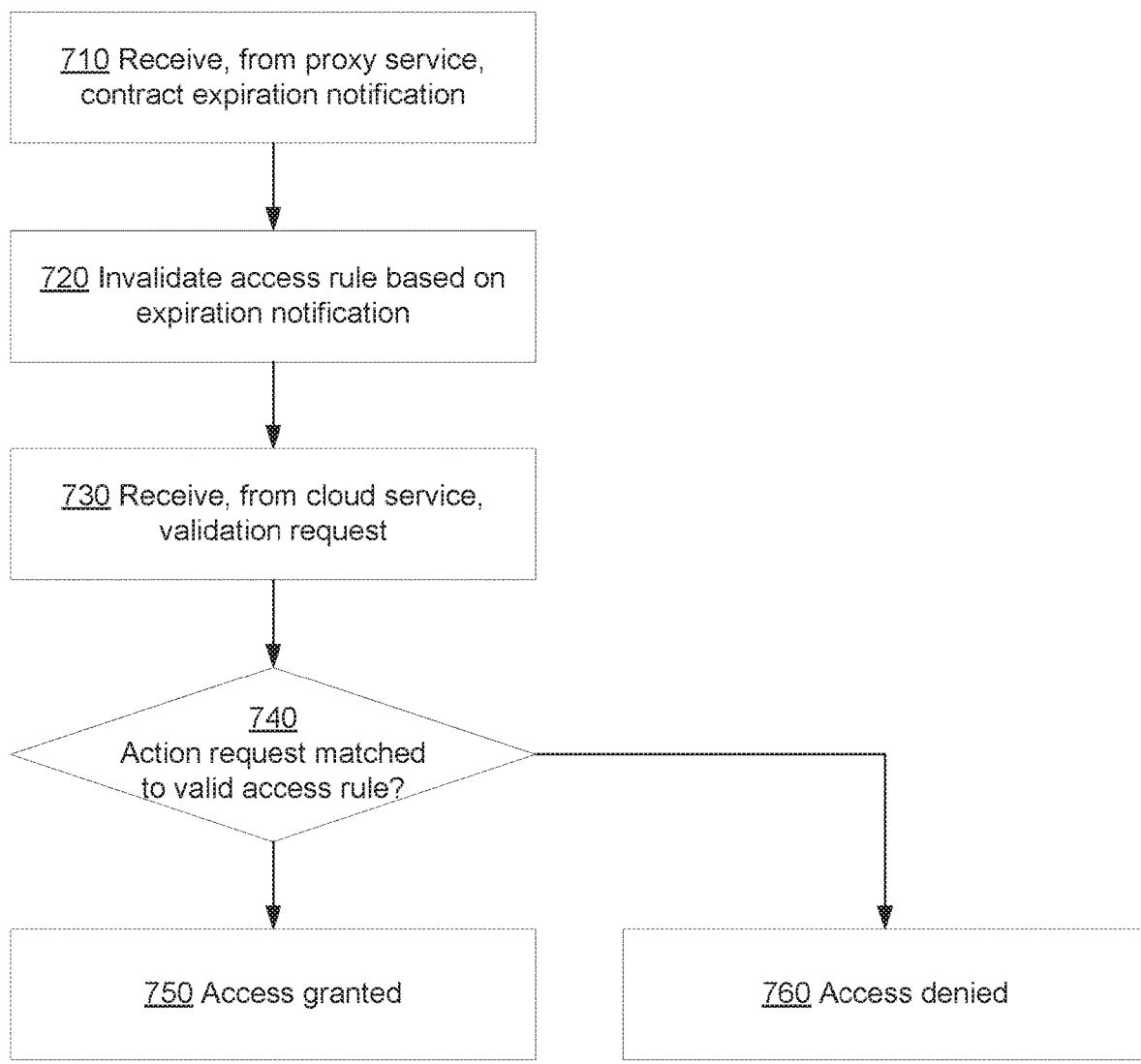
FIG. 7 is a flow diagram of one embodiment of a method implemented by an Identity and Access Management (IAM) service for processing assignment expiration transactions with respect to a cloud based service.

FIG. 7 is a flow diagram of one embodiment of a method implemented by an Identity and Access Management (IAM) service for processing assignment expiration transactions with respect to a cloud based service. Method 700 may be performed by processing logic that includes hardware (e.g., circuitry, dedicated logic, programmable logic, microcode, etc.), software (e.g., instructions run on a processor to perform hardware simulation), or a combination thereof. Method 700 or each of its individual functions, routines, subroutines, or operations may be performed by one or more processors of a computer system (e.g., the computing device 900 of FIG. 9) implementing the method. In one embodiment, method 700 may be performed by a single processing thread. Alternatively, method 700 may be performed by two or more processing threads, each thread implementing one or more individual functions, routines, subroutines, or operations of the method. In one embodiment, the processing threads implementing method 700 may be synchronized (e.g., using semaphores, critical sections, or other thread synchronization mechanisms). Alternatively, the processing threads implementing method 700 may be executed asynchronously with respect to each other. Therefore, while FIG. 7 and the associated description lists the operations of method 700 in certain order, various embodiments of the method may perform at least some of the described operations in parallel or in arbitrary selected orders. In one embodiment, method 700 may be implemented by the IAM service 318 of FIGS. 3A-3B.

Referring to FIG. 7, at block 710, the IAM service implementing the method may receive, from the proxy service, a contract expiration notification. In one example, the expired contract may represent assignment, to an autonomous agent, of access rights with respect to a cloud-based service. Accordingly, the contract expiration notification may specify the assignor (e.g., identified by the distributed ledger client identifier), the assignee (e.g., identified by the identifier of the autonomous agent), and the expired access policy.

At block 750, the IAM service may delete or otherwise invalidate one or more access rule associated with the cloud service identified by the contract expiration notification, in order to reflect the revocation of access rights that were previously granted by the expired access policy specified by the assignment expiration notification.

At block 760, the IAM service may receive, from a cloud service, a validation request with respect to an action request submitted by the autonomous agent.

Responsive to successfully validating, at block 770, the action request, the IAM service may, at block 780, transmit an access authorization message to the cloud service; otherwise, the IAM service may, at block 790, transmit an access refusal message to the cloud service. In one example, validating the action request may involve determining whether an access rule associated with the cloud that has initiated the validation request permits the autonomous agent to perform the operation specified by the action request, as described in more detail herein above.

Figure 8:
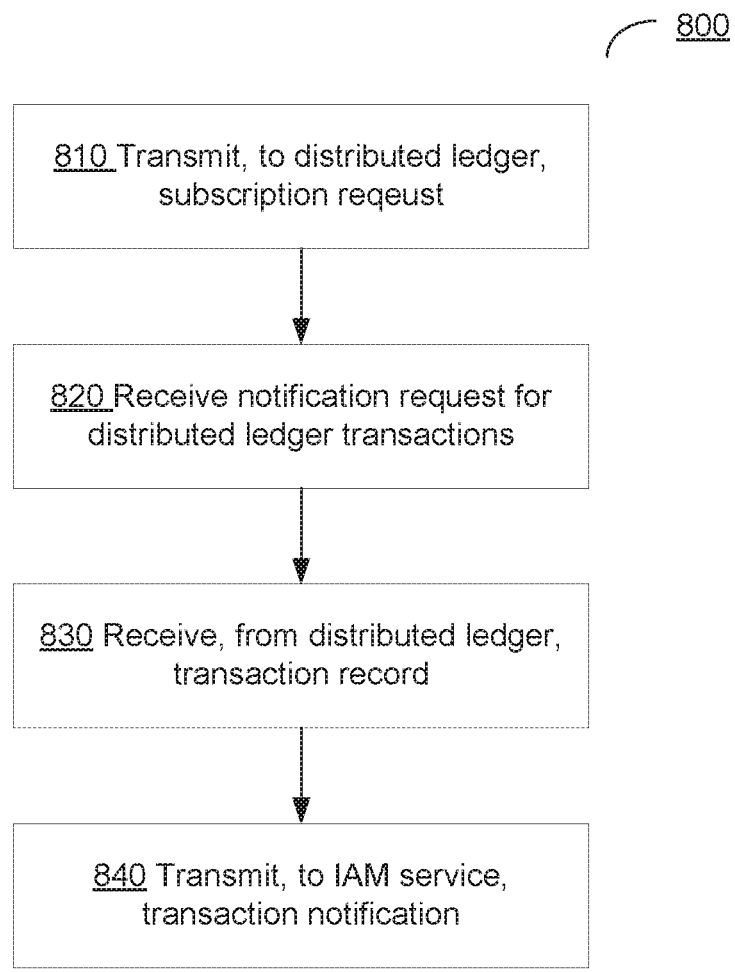
FIG. 8 is a flow diagram of one embodiment of a method performed by a distributed ledger proxy service for providing an interface between an IAM service and one or more distributed ledgers.

FIG. 8 is a flow diagram of one embodiment of a method performed by a distributed ledger proxy service for providing an interface between an IAM service and one or more distributed ledgers. Method 800 may be performed by processing logic that includes hardware (e.g., circuitry, dedicated logic, programmable logic, microcode, etc.), software (e.g., instructions run on a processor to perform hardware simulation), or a combination thereof. Method 800 or each of its individual functions, routines, subroutines, or operations may be performed by one or more processors of a computer system (e.g., the computing device 800 of FIG. 8) implementing the method. In one embodiment, method 800 may be performed by a single processing thread. Alternatively, method 800 may be performed by two or more processing threads, each thread implementing one or more individual functions, routines, subroutines, or operations of the method. In one embodiment, the processing threads implementing method 800 may be synchronized (e.g., using semaphores, critical sections, or other thread synchronization mechanisms). Alternatively, the processing threads implementing method 800 may be executed asynchronously with respect to each other. Therefore, while FIG. 8 and the associated description lists the operations of method 800 in certain order, various embodiments of the method may perform at least some of the described operations in parallel or in arbitrary selected orders. In one embodiment, method 800 may be implemented by the distributed ledger proxy service 310 of FIGS. 3A-3B.

Referring to FIG. 8, at block 810, the distributed ledger proxy service implementing the method may transmit, to one or more distributed ledgers, subscription requests for transactions recorded by the distributed ledgers.

At block 820, the distributed ledger proxy service may receive, from the IAM service, a subscription request for distributed ledger transactions initiated by a distributed ledger client.

At block 830, the distributed ledger proxy service may receive, from a distributed ledger, a transaction record identifying the subscribed client. In one example, the transaction record may represent a contract recorded by the distributed ledger for assignment, to an autonomous agent, of access rights with respect to a cloud-based service. Accordingly, the transaction record may specify the assignor (e.g., identified by the distributed ledger client identifier), the assignee (e.g., identified by the identifier of the autonomous agent), the access policy, and the assignment expiration time. In another example, the transaction record may represent a contract expiration notification. The expired contract may represent assignment, to an autonomous agent, of access rights with respect to a cloud-based service. Accordingly, the contract expiration notification may specify the assignor (e.g., identified by the distributed ledger client identifier), the assignee (e.g., identified by the identifier of the autonomous agent), and the expired access policy.

At block 840, the distributed ledger proxy service may transmit, to an identity and access management (IAM) service, a transaction notification reflecting the received transaction record. In one example, the transaction notification may specify the distributed ledger client identifier, the autonomous agent, the access policy, and the assignment expiration time. In another example, the transaction notification the access policy expiation, as described in more detail herein above.

Figure 9:
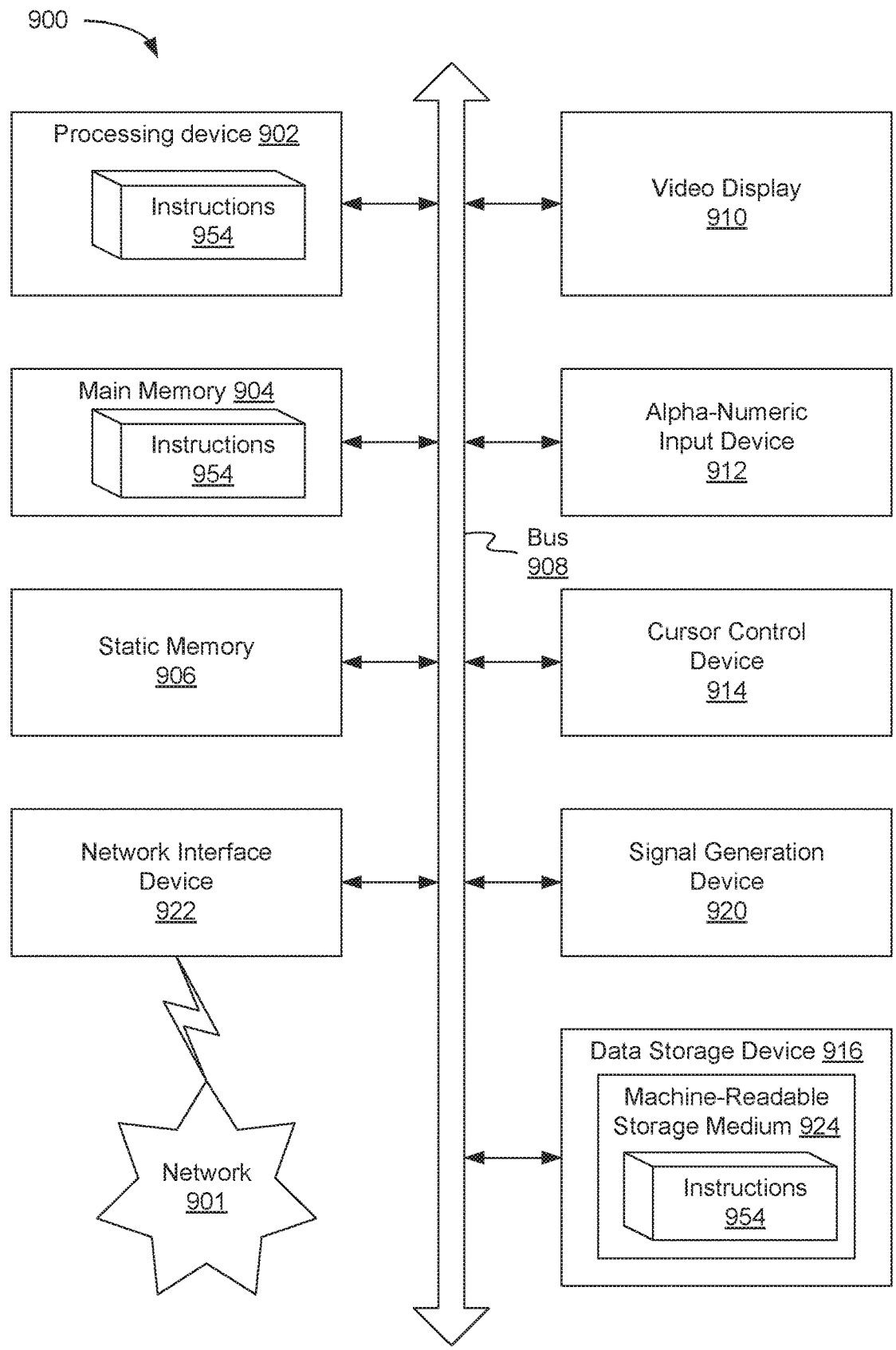
FIG. 9 illustrates a diagrammatic representation of a machine in the exemplary form of a computer system within which a set of instructions, for causing the machine to perform any one or more of the methods discussed herein, may be executed in one embodiment.

FIG. 9 illustrates a diagrammatic representation of a machine in the exemplary form of a computer system within which a set of instructions, for causing the machine to perform any one or more of the methods discussed herein, may be executed in one embodiment. A set of instructions for causing the computing device 900 to perform any one or more of the methods discussed herein may be executed by the computing device 900. In one embodiment, the computing device 900 may implement the functions of the proxy service 310 or the IAM service 318 of FIG. 3.

In one embodiment, the computing device 900 may be connected to other computing devices by a network 901 provided by a Local Area Network (LAN), an intranet, an extranet, the Internet or any combination thereof. The computing device may operate in the capacity of a server or a client machine in a client-server network environment or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computing device" shall also be taken to include any collection of machines (e.g., computers) that individually or jointly execute a set (or multiple sets) of instructions to perform any one or more of the methodologies discussed herein.

In one embodiment, the computing device 900 includes a processing device 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.) and a data storage device 916, which communicate with each other via a bus 908.

In one embodiment, the processing device 902 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 902 may therefore include multiple processors. The processing device 902 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor or the like.

In one embodiment, the computing device 900 may further include one or more network interface devices 922. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and a signal generation device 920 (e.g., a speaker).

In one embodiment, the data storage device 918 may include a computer-readable storage medium 924 on which is stored one or more sets of instructions 954 embodying any one or more of the methods or functions described herein. The instructions 954 may also reside, completely or at least partially, within the main memory 904 and/or within the processing device 902 during execution thereof by the computing device 900; the main memory 904 and the processing device 902 also constituting machine-readable storage media.

While the computer-readable storage medium 924 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods described herein. Examples of computer-readable storage media include, but not limited to, solid-state memories, optical media and magnetic media.

The preceding description sets forth numerous specific details such as examples of specific systems, components, methods and so forth, in order to provide a good understanding of various embodiments described herein. It will be apparent to one skilled in the art, however, that at least some embodiments may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In the above description, numerous details are set forth. It will be apparent, however, to one of ordinary skill in the art having the benefit of this disclosure, that certain embodiments described herein may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. These signals may include bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, passages utilizing terms such as "determining", "identifying", "adding", "selecting" or the like, describe the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations described herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

It is to be understood that the above description is intended to be illustrative and not restrictive. Many other embodiments will be apparent to those of skill in the art upon reading and understanding the above description. The scope of the present disclosure should, therefore, be determined with reference to the appended claims, along with the full scope of equivalents to which such claims are entitled.

What is claimed is:

1. A method comprising:
   receiving, by a computer system, a blockchain address identifying a client of a cryptographically protected distributed ledger;
   receiving, from a proxy service, a transaction notification of a transaction registered by the cryptographically protected distributed ledger, the transaction notification comprising the blockchain address identifying the client as an assignor, an identifier of an autonomous agent identifying an assignee, an identifier of a cloud service, and an access policy specifying one or more access permissions assigned by the assignor to the assignee with respect to the cloud service, wherein the one or more access permissions represent a subset of access rights of the client identified as the assignor of the transaction with respect to the cloud service;
   creating, based on the transaction notification, an access rule for the cloud service, the access rule specifying the one or more access permissions assigned by the transaction to the autonomous agent identified as the assignee of the transaction;
   receiving, from the cloud service, a validation request with respect to an action request that is submitted by the autonomous agent;
   validating the action request by matching the action request to the access rule; and
   notifying the cloud service of validity of the action request.

2. The method of claim 1, wherein the transaction notification further comprises an expiration time of the one or more access permissions assigned by the transaction.

3. The method of claim 1, wherein validating the action request comprises validating a digital signature of the action request.

4. The method of claim 1, further comprising:
   receiving, from the proxy service, an access policy expiration notification comprising the blockchain address, the identifier of the autonomous agent, and the identifier of the cloud service; and
   invalidating the access rule.

5. The method of claim 1, wherein the cloud service is represented by one of: a compute service, an object storage service, or a database service.

6. The method of claim 1, wherein validating the action request further comprises:
   authenticating the autonomous agent based on a digital certificate.

7. The method of claim 1, wherein the autonomous agent is represented by a third-party service.

8. The method of claim 1, wherein the proxy service is implemented by a node of the cryptographically protected distributed ledger.

9. The method of claim 1, wherein the cryptographically protected distributed ledger implements an immutable append-only database in which the transaction records are replicated by a plurality of nodes interconnected by one or more networks.

10. The method of claim 1, wherein the cryptographically protected distributed ledger implements a blockchain.

11. The method of claim 1, wherein the transaction is broadcasted to a plurality of nodes of the cryptographically protected distributed ledger.

12. The method of claim 1, wherein the transaction is digitally signed by the client.

13. The method of claim 1, further comprising:
   transmitting, to the proxy service, a subscription request for distributed ledger transactions that are initiated by the client.

14. The method of claim 1, wherein the action request comprises an identifier of an operation to be performed by the cloud service and one or more parameters of the operation.

15. A non-transitory computer-readable storage medium comprising executable instructions that, when executed by a processing device, cause the processing device to:
   receive a blockchain address identifying a client of a cryptographically protected distributed ledger;
   receive, from a proxy service, a transaction notification of a transaction registered by the cryptographically protected distributed ledger, the transaction notification comprising the blockchain address identifying the client as an assignor, an identifier of an autonomous agent identifying an assignee, an identifier of a cloud service, and an access policy specifying one or more access permissions assigned by the assignor to the assignee with respect to the cloud service, wherein the one or more access permissions represent a subset of access rights of the client identified as the assignor of the transaction with respect to the cloud service;

create, based on the transaction notification, an access rule for the cloud service, the access rule specifying the one or more access permissions assigned by the transaction to the autonomous agent identified as the assignee of the transaction;

receive, from the proxy service, an access policy expiration notification comprising the blockchain address, the identifier of the autonomous agent, and the identifier of the cloud service; and invalidate the access rule granting, to the autonomous agent, access to the cloud service.

16. The non-transitory computer-readable storage medium of claim 15, further comprising executable instructions to cause the processing device to:

receive, from the cloud service, a validation request with respect to an action request submitted by the autonomous agent;

validate, using the access rule, the action request; and notify the cloud service of validity of the action request.

17. A computer system, comprising:

a memory; and a processing device operatively coupled to the memory, the processing device to:

receive a blockchain address identifying a client of a cryptographically protected distributed ledger;

receive, from a proxy service, a transaction notification of a transaction registered by the cryptographically protected distributed ledger, the transaction notification comprising the blockchain address identifying the client as an assignor, an identifier of an autonomous agent identifying an assignee, an identifier of a cloud service, and an access policy specifying one or more access permissions assigned by the assignor to the assignee with respect to the cloud service, wherein the one or more access permissions represent a subset of access rights of the client identified as the assignor of the transaction with respect to the cloud service;

create, based on the transaction notification, an access rule for the cloud service, the access rule specifying the one or more access permissions assigned by the transaction to the autonomous agent identified as the assignee of the transaction;

receive, from the cloud service, a validation request with respect to an action request that is submitted by the autonomous agent;

validate the action request by matching the action request to the access rule; and notify the cloud service of validity of the action request.

18. The computer system of claim 17, wherein the transaction notification further comprises an expiration time of the one or more access permissions assigned by the transaction.

19. The computer system of claim 17, wherein the processing device is further to:

validate a digital signature of the action request.

* * * * *